United States Patent [19]
Elliff

[11] 3,877,907
[45] Apr. 15, 1975

[54] AIR SWIRLING UNIT FOR AIR FILTERS ON INTERNAL COMBUSTION ENGINES

[76] Inventor: Howard E. Elliff, 1301 Donna Kay Dr., Kerrville, Tex. 78028

[22] Filed: June 13, 1974

[21] Appl. No.: 479,154

[52] U.S. Cl. .................. 55/413; 55/510; 123/141
[51] Int. Cl. ............................................. B01d 46/02
[58] Field of Search .............. 55/337, 510, 413–416, 55/456; 123/141

[56] References Cited
UNITED STATES PATENTS
| | | | |
|---|---|---|---|
| 2,461,395 | 2/1949 | Psikal | 55/414 |
| 3,618,981 | 11/1971 | Leisius et al. | 55/455 |

FOREIGN PATENTS OR APPLICATIONS
| | | | |
|---|---|---|---|
| 1,220,174 | 1/1971 | United Kingdom | 55/510 |
| 8,033 | 5/1928 | Australia | 55/455 |

Primary Examiner—Bernard Nozick
Attorney, Agent, or Firm—Ranseler O. Wyatt

[57] ABSTRACT

An air swirling unit for use on the air filter of an internal combustion engine consisting of a series of inwardly and tangentially directed vanes mounted on a framework to be inserted in a conventional air filter housing with the vanes in the path of the incoming air which will direct said air into a circular stream, increasing the velocity of the air as it flows into the carburetor.

4 Claims, 2 Drawing Figures

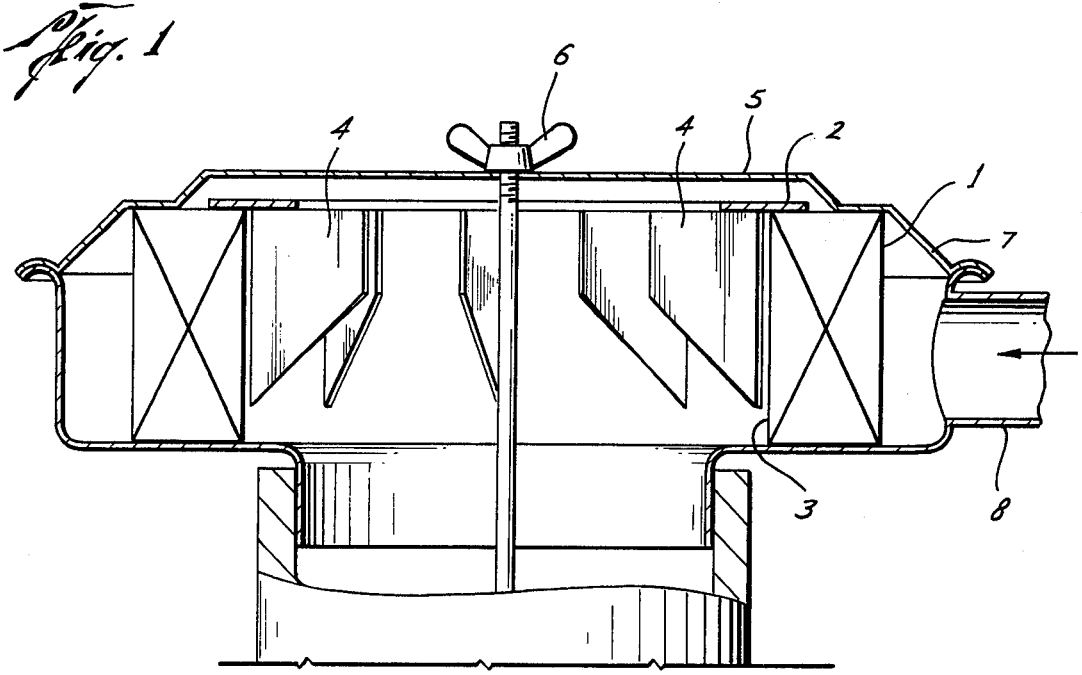
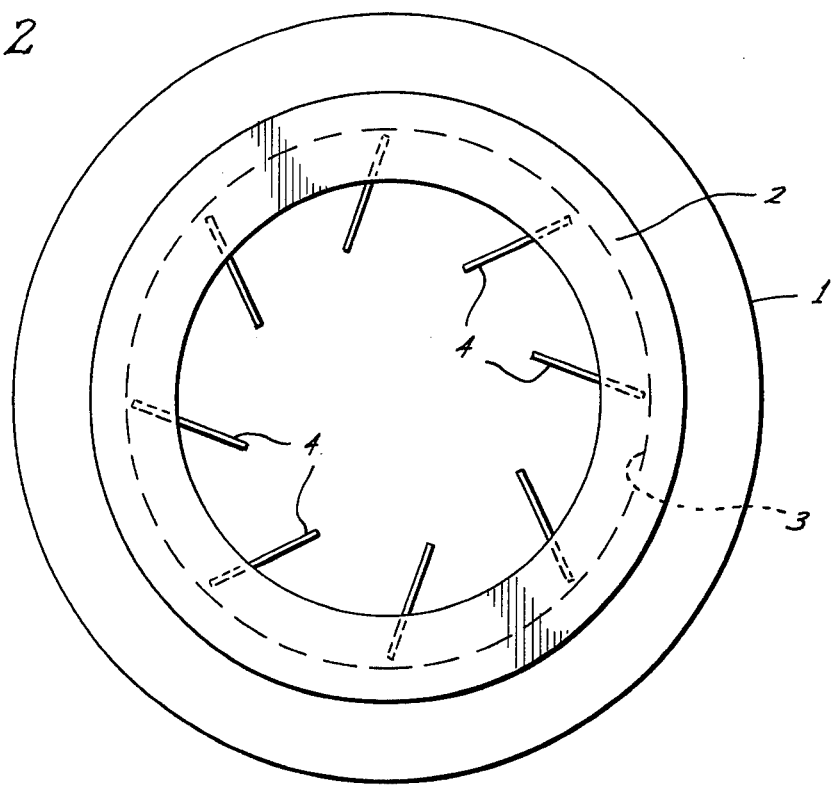

AIR SWIRLING UNIT FOR AIR FILTERS ON INTERNAL COMBUSTION ENGINES

BACKGROUND OF THE INVENTION

In automobile engines, as well as other internal cpmbustion engines, a super charge of fuel, or fuel that is forced into the cylinders, under pressure, results in a more economic use of the fuel and an increase in the effeciency of the engine. This is usually done with pumps, and the like, to force feed the mixed fuel from the carburetor. This is usually an expensive installation and requires the services of a skilled technician. It is an object of this invention to provide means for super charging an internal combustion engine by an inexpensive attachment in the air filter, which may be installed by the user, requiring no great technical skill, and which will increase the fuel mileage and the power delivered.

SUMMARY OF THE INVENTION

A unit for use in the air filter of an internal combustion engine, having a plurality of vanes mounted in the path of the incoming air, directing the air flow into a circular stream, increasing the velocity of the air flow as it passes into the carburetor and cylinders of the engine.

BRIEF DESCRIPTION OF THE DRAWINGS

FIG. 1 is a side elevational view of the device mounted in an air filter housing, shown in cross section.

FIG. 2 is a top plan view of the filter and the swirling unit installed therein.

DESCRIPTION OF THE PREFERRED EMBODIMENT

In the drawings, the numeral 1 designates an air filter commonly found on internal combustion engines, whose function it is to filter the air drawn into the engine by the intake manifold. Mounted in said filter is an annular frame 2 having mounted on the inside wall thereof, and depending into the annular opening 3 in the filter 1, are the vanes 4, 4, which are mounted at an angle of approximately 20° from the transverse cross section of the frame 2. The vanes 4 may be riveted to the frame 2, or may be molded into a single unit, with the frame and vanes being of a rigid material, and with the bottom margins of the vanes extending inwardly and upwardly from the side wall of the filter.

In installation, the cover 5, which is maintained in position by the bolt and wing nut 6, is taken off of the air filter housing 7, and the frame 2, of the proper size for the engine concerned, is then mounted in the annular orifice 3 of the filter, the depending fins 4, 4 extending into the said orifice, and the cover 5 then replaced on the filter housing 7.

As air is drawn into the intake manifold by the engine, it will flow through the intake opening 8 of the housing 7, and thence through the side walls of the filter 1, and a portion thereof will strike the vanes 4 and will be diverted and directed into a circular motion, as it continues to be drawn inwardly into the intake manifold, where it will be heated as it passes therethrough. As the rapidly rotating air stream reaches the carburetor, and is mixed with the fuel and discharged into the cylinders, under pressure, a forced feed effect is obtained.

When the unit is placed in the annular orifice 3 of the air filter, the peripheral rim of the framework 2 rests on the filter below the abutting line surfaces of the filter and cover.

What I claim is:

1. An air filter housing having an inlet and outlet employed on internal combustion engines, a cylindrical filter mounted in the housing intermediate the inlet and outlet to filter the air, a circular framework, and a plurality of inwardly and tangentially directed vanes depending from said framework, said framework being supported by said filter, and said vanes extending into the filter orifice of the filter mounted in said housing.

2. The device defined in claim 1 wherein said vanes extend downwardly and terminate at a point above the bottom of the air filter.

3. The device defined in claim 1 wherein said depending vanes are mounted at an angle of about twenty degrees of the transverse plane of said framework.

4. The device defined in claim 1 wherein said vanes extend downwardly from said framework and inwardly from the side walls of said filter, the lower margins of said vanes extending upwardly from the side walls of said filter.

* * * * *